(12) United States Patent
Kramer et al.

(10) Patent No.: US 8,420,967 B2
(45) Date of Patent: Apr. 16, 2013

(54) BACK-LIT OPERATING UNIT FOR CONSTRUCTION MACHINERY

(75) Inventors: Thomas Kramer, Köln (DE); Armin Montermann, Andernach (DE); Peter Busley, Linz/Rheim (DE)

(73) Assignee: Wirtgen GmbH (DE)

( * ) Notice: Subject to any disclaimer, the term of this patent is extended or adjusted under 35 U.S.C. 154(b) by 814 days.

(21) Appl. No.: 12/539,751

(22) Filed: Aug. 12, 2009

(65) Prior Publication Data
US 2010/0046203 A1 Feb. 25, 2010

(30) Foreign Application Priority Data

Aug. 19, 2008 (DE) .................. 20 2008 011 050 U

(51) Int. Cl.
*H01H 9/00* (2006.01)
*G09F 13/04* (2006.01)
(52) U.S. Cl.
USPC ......................................... 200/314; 362/97.1
(58) Field of Classification Search .............. 362/23–29; 200/314
See application file for complete search history.

(56) References Cited

U.S. PATENT DOCUMENTS

| 4,376,879 A | 3/1983 | Nagata et al. |
| 6,156,411 A | 12/2000 | Jennings |
| 7,507,924 B2 * | 3/2009 | Lorenzo Riera et al. ..... 200/314 |

OTHER PUBLICATIONS

Exhibit A: EPO Search Report in European Patent Application No. EP 09 01 0361, dated Aug. 29, 2011, 4 pp.
Admitted prior art per paragraph [0002] of the application as filed.
Admitted prior art per paragraph [0003] of the application as filed.
Admitted prior art per paragraph [0004] of the application as filed.
Admitted prior art per paragraph [0005] of the application as filed.
Admitted prior art per paragraph [0006] of the application as filed.

\* cited by examiner

*Primary Examiner* — Anabel Ton
(74) *Attorney, Agent, or Firm* — Waddey & Patterson, P.C.; Lucian Wayne Beavers

(57) ABSTRACT

A back-lit operating unit for construction machinery includes a front panel having a plurality of cut-outs. Operating components are received in the cut-outs. A lighting device is arranged behind the front panel. The front panel has a sandwich construction including a carrier panel, a transparent mounting panel located on a front of the carrier panel, and a transparent film located on a front of the mounting panel.

14 Claims, 3 Drawing Sheets

BACK-LIT OPERATING UNIT FOR CONSTRUCTION MACHINERY

BACKGROUND OF THE INVENTION

1. Field of the Invention

The invention relates to a back-lit operating unit for construction machinery, in particular road milling machines, recyclers, or stabilizers.

2. Description of the Prior Art

Construction machines of different designs for civil engineering and excavation work are well-known. As road-building machines, for example, milling machines, recyclers, stabilizers, or surface miners are known. The known construction machines are provided with one or more operating stands with an operating unit, in order to be able to operate the construction machine.

The operating units of known construction machines, which are subjected to relatively great mechanical stresses, are in general provided with a rigid front panel, in which the components required for the operating of the machine, such as buttons, switches or joysticks etc. are located. These components for operating the machine are clamped or screwed to the front panel.

The known back-lit operating units are provided with a front panel which is transparent in certain areas, which is lit from behind. As a result, the transparent areas appear as light zones, while the remainder of the panel is dark. Front panels are known for back-lit operating units which are adhesively bonded to a printed and essentially transparent film, on which the desired graphic representations are printed as negatives. To increase the contrast, the film can be provided on its rear in the areas which are not back-lit with an aluminium blocking layer. The intention of the blocking layer is to prevent the areas which are not back-lit from showing through when the front panel is lit from behind.

The principle is known of manufacturing the front panel from aluminium sheet and of providing cut-outs in the back-lit areas. This proves to be disadvantageous, since the film impinges in the areas of the cut-outs, which becomes visually evident. In addition to this, the film functions at this point like a membrane, which is not adequate for the mechanical loads imposed. If the membrane is broken, for example, fluid may penetrate and the front panel must be repaired, incurring effort and expenditure.

The principle is already known of manufacturing the front panel from transparent material, such as polycarbonate. Due to the high mechanical loads which may take effect on a front panel, the material thickness in this case must be selected as many times greater than with the use of aluminium sheet. The conventional commercial components for the operation of the machine, such as switches, buttons, or joysticks, predetermine a specified material thickness for the front panel, however, in order for the components to be fitted. This derives from the dimensioning of the securing elements, such as the thread length with screw connections or the distance interval between the locking elements with snap connections. Accordingly, when polycarbonate panels are used with too great a material thickness, simple passage apertures are insufficient, and offset apertures must be provided, which are expensive and elaborate to produce.

SUMMARY OF THE INVENTION

The invention is based on the object of providing a back-lit operating unit for construction machines which allows for simple and rapid installation of the components required for the operation of the machine in the front panel of the operating unit, whereby the front panel is to be manufactured simply and economically.

The front panel of the back-lit operating unit according to the invention is designed as a sandwich structure. The sandwich structure comprises a transparent film which is provided with graphic representations, such that the film is impermeable to light in specific areas, a transparent mounting panel on which the transparent film is located, and a carrier panel on which the transparent mounting panel with the transparent film is located. In this situation, the mounting panel and carrier panel provide for adequate rigidity of the front panel. For example, it is possible for specific symbols to be represented on the film provided with graphic representations as transparent areas or non-transparent areas, while the other areas of the film are not transparent or are transparent respectively. Accordingly, the symbols appear light on a dark background or dark on a light background respectively.

The carrier panel may consist of a transparent or non-transparent material. If the carrier panel is not made of transparent material, it exhibits cut-outs arranged for back-lighting under the graphic representations, through which the light can penetrate from the lighting device arranged behind the front panel.

Any reference to a transparent film or a transparent mounting panel or carrier panel in this context is understood to mean a film or panel which is at least partially permeable to light. In this situation the film or panel does not need to be as clear as glass, however, but can also be tinted in different colours. Likewise, the surface can be subjected to a specific treatment in order to achieve special effects. For example, the surface can be subjected to radiated light in order to produce a diffuse light. The term components for operating the construction machine is understood to mean not only all the actuating elements such as switches, buttons, or joysticks, but also display units or the like, which indicate specific operational states to the user of the machine.

With a particularly preferred embodiment of the operating unit according to the invention, cut-outs are provided for the installation of the components for operating the construction machine both in the transparent mounting panel as well as in the carrier panel. The cut-outs arranged above one another in the mounting panel and carrier panel are in each case delimited by a circumferential edge, and are dimensioned in such a way that the circumferential edge of the cut-outs in the mounting panel extend inwards over the circumferential edge in the carrier panel, forming a contact surface for securing the components for operating the construction machine. This results in the situation that conventional commercial components for the operation of the construction machine can be secured to the front panel. The only decisive factor is the thickness of the transparent mounting panel on which the film is located. The thickness of the carrier plate, by contrast, can be dimensioned differently, regardless of the dimensions of the components for the operation of the construction machine, as a function of the requirements for rigidity of the front panel. To advantage, the material thickness of the front plate is selected in such a way that it corresponds to the smallest maximum clamping thickness of all the components used. If a component has a maximum clamping thickness which is greater than or equal to the sum of the thickness of the mounting panel and carrier panel, then the cut-outs of the mounting panel and carrier panel can be of the same dimensions. The size of the cut-outs in the mounting panel and carrier panel is determined according to the dimensions of the components for the operation of the construction machine. Regardless of the size of the cut-outs in the mounting panel and carrier panel, or the material thickness of the mounting panel and carrier panel the cut-outs are simple passage apertures, which can be formed with economical methods, such as water-jet cutting or laser cutting.

In a further preferred embodiment of the operating unit according to the invention, the components located in the front panel for operating the construction machine exhibit a housing body which is located in the cut-outs of the mounting panel and carrier panel, arranged above one another. The housing body exhibits for preference at least one upper step, pointing outwards, with which the housing body lies on the film, and at least one lower step, pointing outwards, by which the housing body is supported on the contact surface of the mounting panel. It is therefore possible for conventional commercial components to be fitted to the front panel with screw and snap connections. In this situation, the lower outwards pointing step of the housing body, which is supported on the contact surface of the mounting panel, is formed from a securing nut or at least one locking element. The locking element can, for example, be formed as a hook-shaped step of the housing body, with which the housing body is secured in the front panel by snap connections.

The carrier panel and the mounting panel can be manufactured of different materials. In a preferred embodiment, the carrier panel is a metal panel and/or the mounting panel is a plastic panel.

The cut-outs in the carrier panel and mounting panel are for preference rectangular or circular cut-outs, such that the conventional commercial components for operating the construction machine, which are provided with corresponding housing bodies can be inserted into the cut-outs with a good fit.

In addition to the cut-outs for the back-lighting and the cut-outs for accommodating the components for operating the construction machine, the carrier panel of the front panel is also provided for preference with further cut-outs for accommodating further components for retro-fitting of the operating unit. If it is intended that the operating unit should be retrofitted with further switches or buttons, all that is required is for corresponding passage apertures to be broken through in the mounting panel, which is for preference made of plastic. To do this, the mounting panel can be provided with predetermined break points. The carrier panel, made for preference of metal, is by contrast provided with a complete cut-out.

A further particularly preferred embodiment makes provision for a printed circuit board to be arranged behind the front panel, on which the lighting unit is secured. The printed circuit board can be a copper-laminated board, provided with conductor paths. The lighting device for the back-lighting of the front panel exhibits for preference a plurality of LED's with which the printed circuit board is fitted. Other lighting means can also be used for the back-lighting, however.

In addition to the lighting device, the printed circuit board can also carry further switching circuits which are necessary for the operating unit. In particular, the contact arrangements for the components for operating the construction machine can be put into effect on the printed circuit board.

In a further particularly preferred embodiment, press-in bolts are pressed into the mounting panel and/or carrier panel of the front panel, with which the printed circuit board is secured in place. The sandwich structure of mounting panel and carrier panel in this situation allows for reliable securing of the bolts, in particular when a metal panel is used as a carrier panel.

In addition to this, a seal can be applied at the outer edge, running around the circumference of the carrier panel.

The invention is explained hereinafter in greater detail, making reference to the drawings.

BRIEF DESCRIPTION OF THE DRAWINGS

These show.

DETAILED DESCRIPTION

Figure 1:
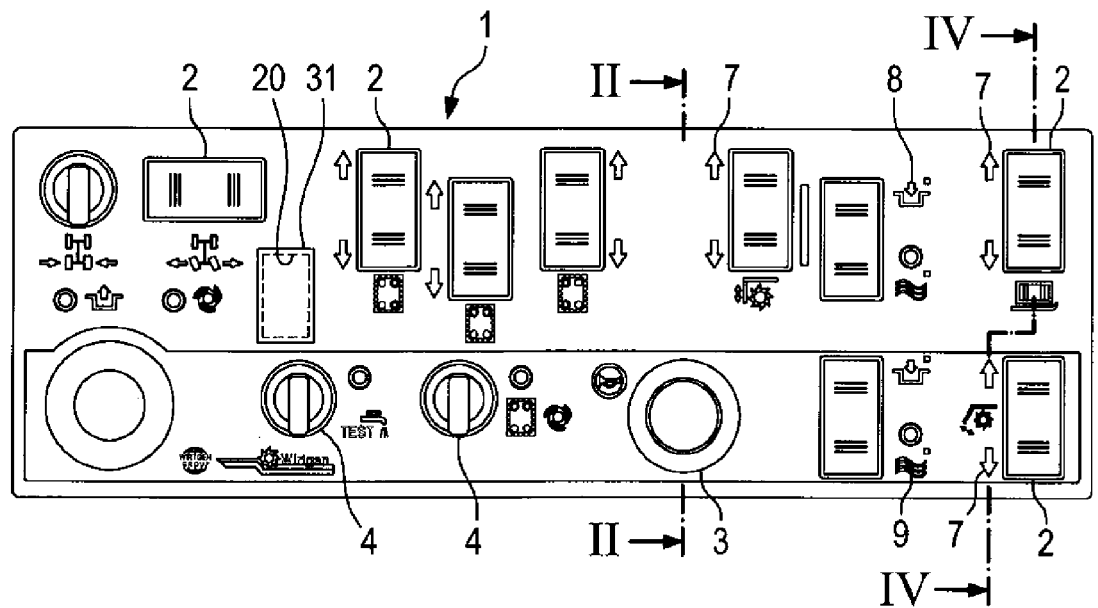
FIG. 1 The operating device according to the invention, with the front panel, in a plan view, FIG. 2 A section along the line II-II from FIG. 1, FIG. 3 The section III from FIG. 2 in an enlarged representation, FIG. 4A section along the line IV-IV from FIG. 1, FIG. 5 The section V from FIG. 4 in an enlarged representation, and FIG. 6 The section VI from FIG. 4 in an enlarged representation.
Figure 2:
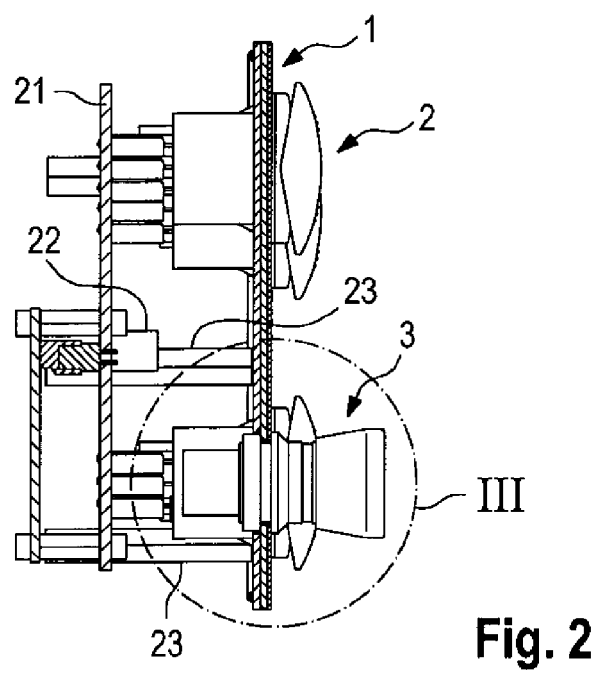

FIG. 1 shows the operating unit for a construction machine in a plan view. The operating unit exhibits a front panel 1, into which various components 2, 3, 4 are inserted for operating the construction machine. The front panel is a back-lit front panel, which is designed as a sandwich structure.

The structure of the front panel 1 can be seen from FIGS. 2 to 6. The front panel 1 exhibits a rectangular transparent plastic panel 5, the thickness of which is dimensioned in such a way as to allow for the mounting of the operating components 2, 3, 4 for operating the construction machine. The mounting of the components for operating the construction machine is described in detail hereinafter.

Located on the transparent plastic panel 5 is a printed transparent film 6. The film 6 is printed in such a way that different areas, representing different symbols, are not printed, but all other surface areas are printed. Accordingly, the film is permeable to light in the area of the symbols, but not permeable to light in the other areas. FIG. 1 shows the different symbols 7, 8, 9, with which the transparent film 6 of the front panel is "printed". It is understood that coloured symbols can also be represented if a coloured medium is used for the symbols which does not fully cover them.

The mounting panel 5 is provided with several round mounting panel component cut-outs 10, or rectangular cut-outs, not represented in the figures, for accommodating the components 2, 3, for operating the construction machine, whereby the shapes and dimensions of the cut-outs 10 are determined according to the type of component for operating the construction machine.

Figure 3:
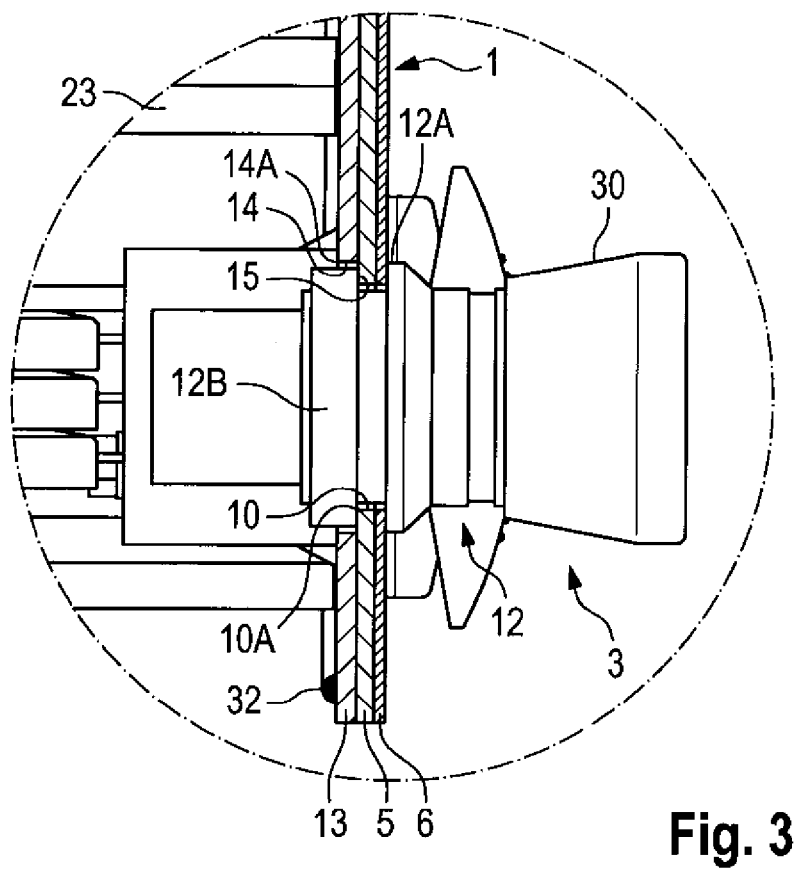
Figure 4:
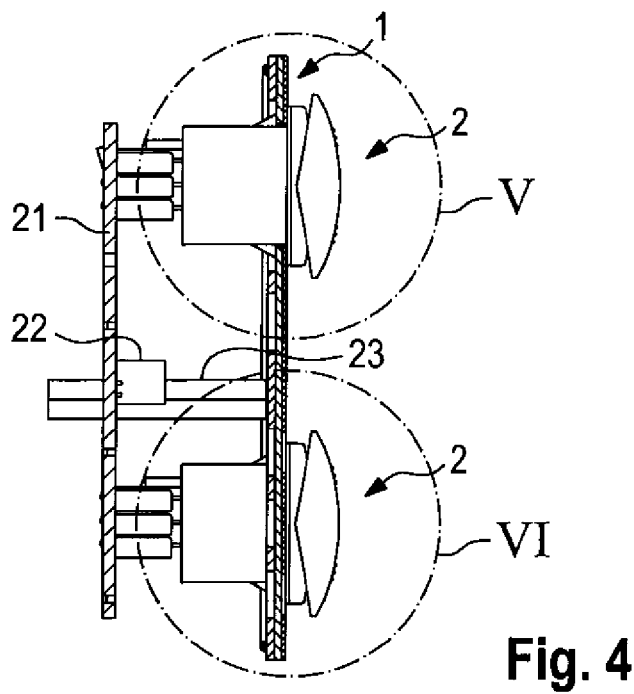

FIG. 3 shows in an enlarged representation a button 3, which is located in a circular cut-out 10. The button 3 exhibits a cylindrical housing body 12 with a button element 30. The cylindrical housing body 12 is located in the circular cut-out 10 of the mounting panel 5, whereby the button, with a circumferential step 12A pointing laterally outwards, lies on the upper side of the front panel, i.e. on the upper side of the film 6. The button 3 is secured to the mounting panel 5 of the front panel 1 with a securing nut 12B.

The mounting panel 5 with the film 6 is located on a rectangular carrier panel 13 made of aluminium. The carrier panel 13 made of aluminium not only ensures the required rigidity of the sandwich construction, but can also serve as a light-impermeable blocking layer for the back-lighting.

The carrier panel 13, like the mounting panel 5, exhibits carrier panel component cut-outs 14, adapted to the shape and dimensions of the components 2, 3, for the operation of the construction machine, these cut-outs being arranged beneath the corresponding cut-outs 10 in the mounting panel 5. FIG. 3 shows a circular cut-out 14 in the carrier panel 13, the diameter of which is slightly greater than the diameter of the corresponding cut-out 10 in the mounting panel 5. Both cut-outs are delimited by a circumferential edge 10A, 14A, whereby, due to the different diameters of the two cut-outs, a circular contact surface 15 is located between the inner circumferential edge 10A of the cut-out 10 in the mounting panel 5 and the inner circumferential edge 14A of the cut-out 14 in the carrier panel 13, on which the securing nut 12B of the button 3 is supported. It can further be seen from FIG. 3 that the diameter of the cut-out 14 in the carrier panel 13 is slightly greater than the diameter of the securing nut 12B of the button 3. It is of advantage that the button 3 can be screwed to the mounting panel 5 regardless of the thickness of the carrier panel 13. The only decisive factor is the thickness of the mounting panel 5, of which the thickness corresponds to the clamping area available of the button 3.

Figure 5:
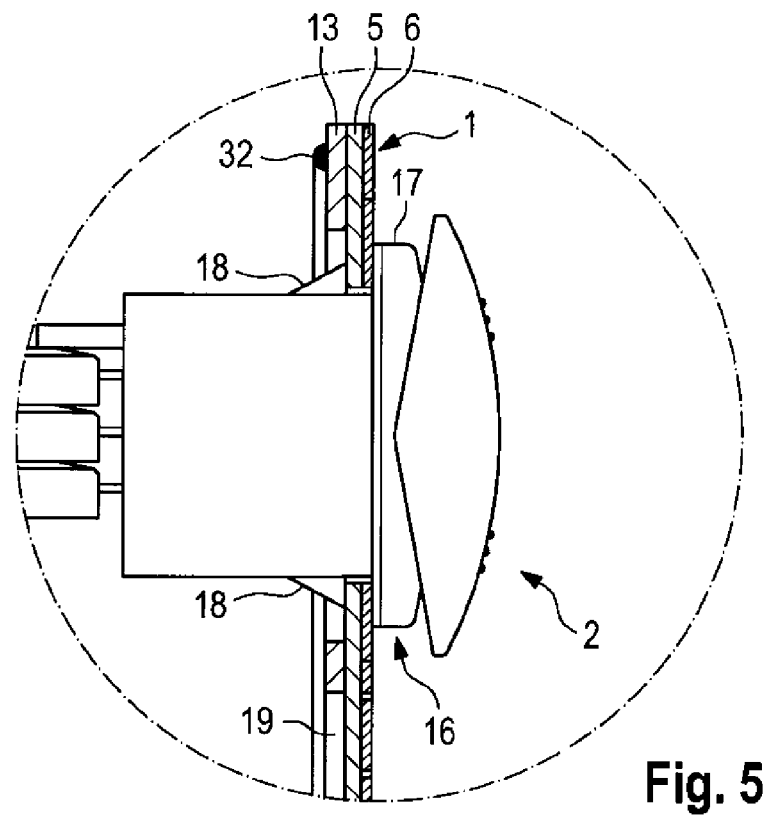
Figure 6:
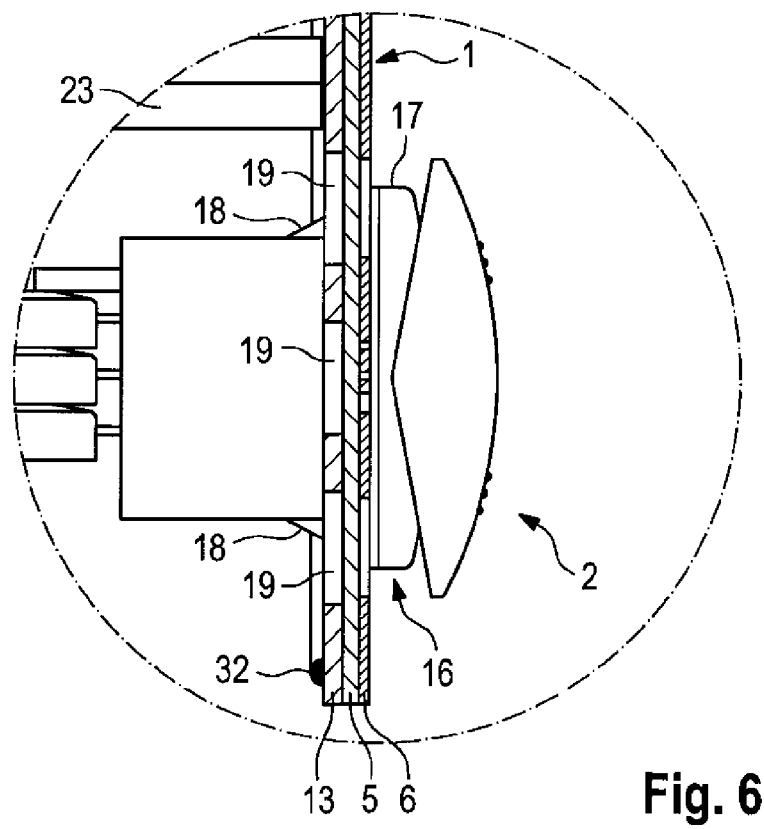

In addition to the buttons 3, the operating unit also exhibits switches 2, of which the housing bodies 16 have a rectangular cross-section. Accordingly, the cut-outs in the mounting panel and carrier panel 5, 13, are rectangular cut-outs of corresponding dimensions. The housing bodies 16 of the switches 2 again exhibit an upper step 17, pointing laterally outwards, with which the buttons lie on the front panel, and two opposing lower steps 18, pointing laterally outwards, which are formed as hook-shaped. With the hook-shaped steps 18, the switches 2 are supported on the contact surface of the mounting panel 5 (FIG. 5).

In addition to the component cut-outs for the buttons and switches, the mounting panel also exhibits back-lighting cut-outs for the back-lighting of the symbols whereby the dimensions and shapes of these cut-outs are adapted to the individual symbols in each case. For example, under the "arrows" 7, rectangular back-lighting cut-outs 19 are provided in the carrier panel 13 (FIG. 5). If the front panel 1 is lit from the rear, the light passes through the cut-outs 19 in the carrier panel 13, the transparent mounting panel 5, and the transparent film 6 in the area of the "arrows", with the result that the "arrows" appear light, but the background appears dark.

For the subsequent fitting of further buttons or switches, or other components for operating the construction machine, further retro-fit cut-outs 20 can be provided in the carrier panel 13, of which only one is indicated in FIG. 1, however, by way of broken lines. These retro-fit cut-outs 20 can be located in corresponding areas of the front panel at which it is intended that further buttons or switches should be inserted. These areas can be marked for identification on the upper side of the film 6. For example, the film 6 can be identified by a rectangular drawn line 31 in the area beneath which the cut-out 20 is located in the carrier panel 3 for the subsequent fitting of an additional switch 2. The corresponding cut-out in the mounting panel can be provided with a predetermined break point, such that the cut-out can be easily formed subsequently.

The back-lighting for the front panel is located on a printed circuit board 21 arranged behind the front panel 1, this board being a printed circuit. The lighting device includes a plurality of light-emitting diodes 22, with which the printed circuit board 21 is fitted on the side facing the front panel 1. Also located on the printed circuit board 21 are conductor paths, not visible in the figures, for providing the contacts for the components for operating the construction machine. The printed circuit board 21 is secured with several press-in bolts 23, which are pressed into the carrier panel 13 of the front panel 1. A seal 32 located circumferentially at the edge of the carrier panel can be seen in FIG. 5.

The operating unit according to the invention can be used not only with construction machines but with all other machines as well.

The invention claimed is:

1. A back-lit operating unit for construction machines, comprising:
a front panel having a plurality of front panel component cut-outs defined therein, the front panel having a sandwich construction including:
a carrier panel;
a transparent mounting panel located on a front of the carrier panel; and
a transparent film located on a front of the mounting panel, the film including graphic representations;
a plurality of operating components received in the component cut-outs in the front panel, for operating the construction machine; and
a lighting device arranged behind the front panel, to provide back-lighting for the front panel.

2. Operating unit for construction machines according to claim 1, wherein:
the mounting panel includes a plurality of mounting panel component cut-outs;
the carrier panel includes a plurality of carrier panel component cut-outs;
the mounting panel component cut-outs and the carrier panel component cut-outs being arranged one above another and being delimited by peripheral edges dimensioned such that the peripheral edge of each of the mounting panel component cut-outs extends laterally inward over the peripheral edge of the associated carrier panel component cut-out forming a contact surface for securing the operating components for operating the construction machine; and
the front panel component cut-outs are defined by the mounting panel component cut-outs and the carrier panel component cut-outs.

3. Operating unit for construction machines according to claim 2, wherein the operating components located in the front panel for operating the construction machine each include a housing body located in the mounting panel component cut-outs and the carrier panel component cut-outs and the housing body includes at least one upper step facing laterally outwards and engaging the film, and at least one lower step facing laterally outwards, and engaging the contact surface of the mounting panel to support the housing body in the front panel.

4. Operating unit for construction machines according to claim 3, wherein the lower step of the housing body is formed from a securing nut.

5. Operating unit for construction machines according to claim 3, wherein the lower step of the housing body comprises at least one locking element.

6. Operating unit for construction machines according to claim 1 wherein the carrier panel is a metal panel and the mounting panel is a plastic panel.

7. Operating unit for construction machines according to claim 2, wherein the carrier panel component cut-outs and the mounting panel component cut-outs are rectangular cut-outs.

8. Operating unit for construction machines according to claim 2, wherein the carrier panel component cut-outs and the mounting panel component cut-outs are circular cut-outs.

9. Operating unit for construction machines according to claim 1, wherein the carrier panel is a panel which is impermeable to light, and the carrier panel includes back-lighting cut-outs arranged beneath the graphic representations, through which the light from the lighting device passes.

10. Operating unit for construction machines according to claim 9, wherein the carrier panel further includes retro-fit cut-outs for accommodating further components for operating the construction machine for retrofitting of the operating unit.

11. Operating unit for construction machines according to claim 1, further comprising a printed circuit board arranged behind the front panel, the lighting device being arranged on the printed circuit board.

12. Operating unit for construction machines according to claim 11, wherein the lighting device includes a plurality of LED'S.

13. Operating unit for construction machines according to claim 11, further comprising press-in bolts pressed into at least one of the mounting panel and the carrier panel of the front panel, the printed circuit board being secured to the press-in bolts.

14. Operating unit for construction machines according to claim 1, wherein at least one of the operating components for operating the construction machine is a switch or button.

\* \* \* \* \*

UNITED STATES PATENT AND TRADEMARK OFFICE
CERTIFICATE OF CORRECTION

PATENT NO. : 8,420,967 B2
APPLICATION NO. : 12/539751
DATED : April 16, 2013
INVENTOR(S) : Kramer et al.

It is certified that error appears in the above-identified patent and that said Letters Patent is hereby corrected as shown below:

On the Title Page, at (75) Inventors, replace "Linz/Rheim" with --Linz/Rhein--.

Signed and Sealed this
Twentieth Day of August, 2013

Teresa Stanek Rea
*Acting Director of the United States Patent and Trademark Office*